Patented Oct. 6, 1942

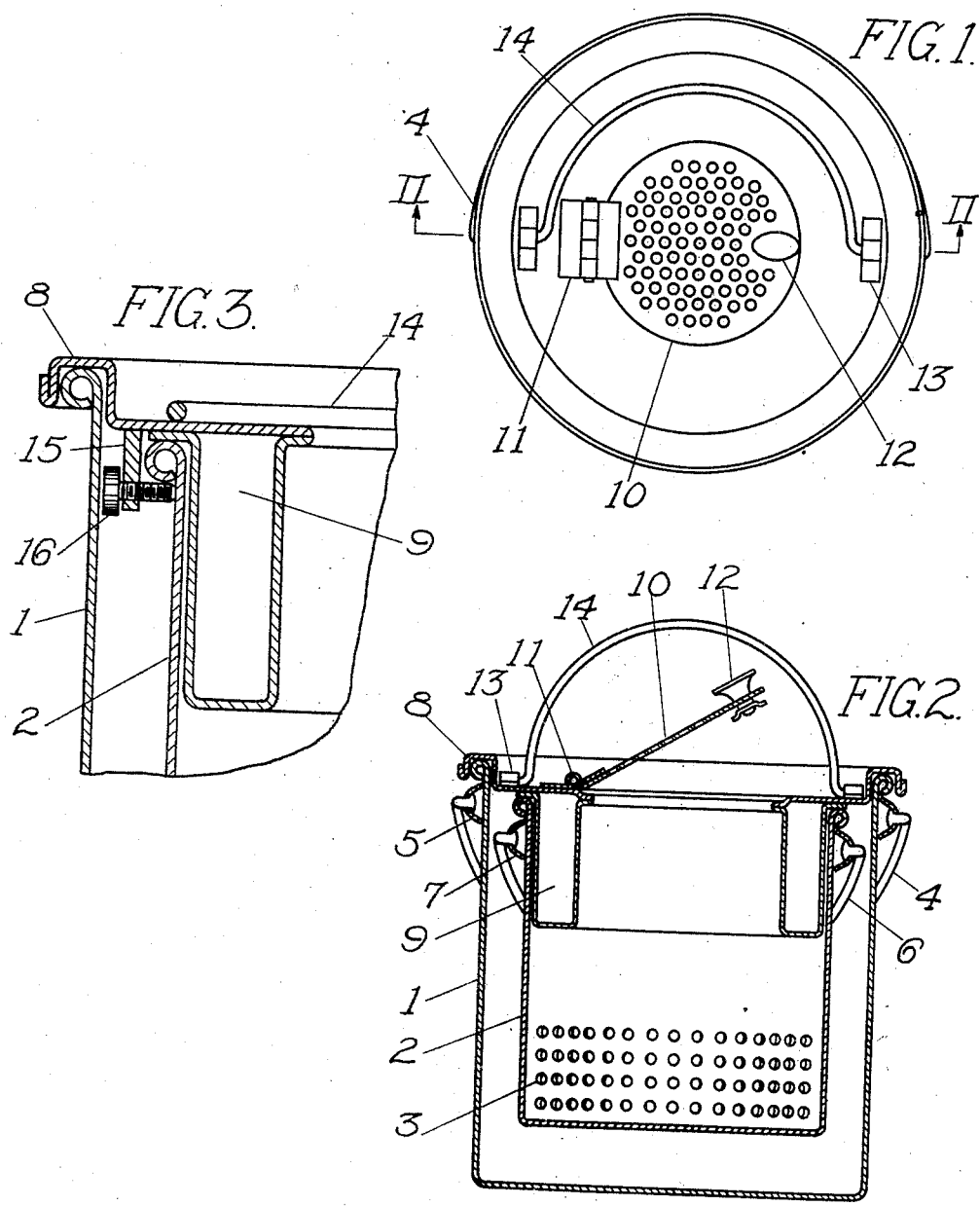

2,297,843

UNITED STATES PATENT OFFICE 2,297,843

BAIT BUCKET

Edwin V. Sharpnack, Arnold, Pa.

Application June 28, 1940, Serial No. 342,982

4 Claims. (Cl. 43—56)

This invention relates to improvements in live bait buckets, and particularly to live bait buckets of the type provided with removable foraminous inner receptacles which are adapted to be floated in a natural body of water for the preservation of the bait.

It is an object of the present invention to provide a strong and convenient form of live bait bucket, having details of construction which make all of the exposed surfaces readily accessible for cleaning, thereby minimizing the opportunity for corrosive attack, which is one of the principal causes of deterioration of equipment of this type.

Another object is the provision of a bait bucket of this type, the component parts of which are conveniently designed for general utility as camp utensils for the preparation and cooking of food and similar purposes.

These and other objects of the invention will be more fully described with reference to the following description and the accompanying drawing, in which:

Fig. 1 is top plan view of the bait bucket with the bait bucket cover in place;

Fig. 2 is a sectional elevation of the bait bucket with the section taken along the line II—II of Fig. 1;

Fig. 3 shows an enlarged fragmentary sectional view of the upper portion of the bait bucket taken at right angles to section II—II.

Referring to the drawing, the parts of the bait bucket designated by numerals are: 1, the pail proper, which is preferably of simple cylindrical shape, provided with a bead at its upper edge; 2 is a foraminous receptacle, which is also preferably of substantially cylindrical shape, provided at its upper edge with a bead. This inner receptacle is preferably formed of sheet metal provided with perforations 3, though it may be formed from reticulated metal, such as wire screen fabric. The outer pail is provided with a bail 4, hinged in suitable ears 5, rigidly attached to the pail proper in any well known manner. The inner receptacle 2 is provided with a similar bail 6, hinged in ears 7, attached to the outer wall of the receptacle. The receptacle 2 is preferably of such size that it may be conveniently inserted in the pail 1.

The reference numeral 8 is used generally to designate the cover for the pail 1 and the receptacle 2, and is also adapted to serve as a float for the receptacle 2. This cover member is preferably provided with an annular channel adjacent to its outer edge, and so disposed as to engage the bead of the pail 1 in the manner shown. The float chamber 9, preferably of substantially rectangular cross section and annularly disposed about the center of the cover, is defined by an annular channel preferably having its edges outwardly turned, as shown. The channel is preferably integrally united with the cover 8 by welding, soldering, or the like, though it may alternatively be secured by other types of fastening means. It is imperative, however, that the float chamber be sealed to prevent the ingress of water. The outer diameter of the float chamber 9 should permit of its ready disposition within the interior of the receptacle 2. The cover 8 is provided with a centrally disposed opening lying within a plane defined by the vertically projected inner wall of the float chamber. A closure 10 is provided to close this last mentioned opening, and is preferably perforated to allow ingress of air to the inner receptacle. The closure 10 is attached to the cover 8 by the hinge 11, about which the closure may be swung. The closure 10 is provided with a latch 12, to maintain it in the closed position. The latch illustrated is of a well known type and is adapted for engagement with the under side of the cover 8, within the centrally disposed opening, by a simple rotative movement. The cover is provided with two ears 13 on its upper surface, in which a bail 14 is hinged.

Fig. 3 illustrates a convenient method for effecting a separable connection of the receptacle 2 with the cover 8. The cover 8 is provided on its under side with a plurality of integrally united dependent projections 15. These projections are each threaded for engagement with thumb screws 16, the ends of which engage the under side of the bead on receptacle 2 in the manner shown, thus providing a substantial space between the respective bottoms of the vessels. When so engaged, the cover and the receptacle 2 can be removed from the pail 1 by a lifting force applied on bail 14.

Upon removal from the pail 1 in the manner described, the receptacle 2 and the cover 8 provide a cage for the bait which is adapted to be placed in a natural body of water for the preservation of the bait. The entire structure, comprising the cover 8 and the receptacle 2, is supported at or near the surface of the water by the float chamber 9. The closure 10 provides easy access to the receptacle 2 for the removal of the bait.

It may be seen that when the receptacle 2 and the cover are removed from the pail 1, that the pail can be utilized for cooking or other general culinary purposes. The inner receptacle 2 can be removed from the cover by backing out the thumb screws 16. The receptacle when removed from the cover, together with the attached bail 6, forms a convenient drain bucket of general utility in the preparation of foods.

From the foregoing description, it is thought that the construction and advantages of the herein described invention will be apparent to those skilled in the art. It will be understood that various changes in the size, shape, proportion, and the minor details, such as the various fastening means employed, may be resorted to without sacrificing any of the advantages of the invention as described in the appended claims.

I claim:

1. A bait bucket comprising a pail, a foraminous receptacle adapted to fit within said pail, a cover for said pail including an integral float chamber, and separable connecting means for securing said inner receptacle to said cover.

2. A bait bucket comprising a pail, a foraminous receptacle adapted to fit within said pail, a cover for said pail including an integral annularly disposed float chamber adapted to fit within said inner receptacle, and separable connecting means for securing said inner receptacle to said cover.

3. A bait bucket comprising a pail, a foraminous receptacle adapted to fit within said pail, a cover for said pail including an integral annularly disposed float chamber adapted to fit within said inner receptacle, separable connecting means for securing said inner receptacle to said cover, said cover being provided with a centrally disposed opening provided with a closure for access to bait within the receptacle.

4. A bait bucket comprising a pail provided with a hinged bail, a substantially straight walled foraminous receptacle provided with a hinged bail and adapted to fit within said pail, a cover for said pail including an integral annularly disposed float chamber adapted to fit within said inner receptacle, separable connecting means for securing said inner receptacle to said cover, said cover being provided with a hinged bail and a centrally disposed opening provided with a closure for access to bait within the inner receptacle.

EDWIN V. SHARPNACK.